US009346160B2

(12) United States Patent
Edsinger et al.

(10) Patent No.: US 9,346,160 B2
(45) Date of Patent: May 24, 2016

(54) MODULAR RECONFIGURABLE WORKCELL FOR QUICK CONNECTION OF PERIPHERALS

(71) Applicant: Redwood Robotics, Inc., San Francisco, CA (US)

(72) Inventors: Aaron Edsinger, San Francisco, CA (US); Anthony Sean Jules, San Francisco, CA (US); Stefan Nusser, San Francisco, CA (US); Advait Jain, San Francisco, CA (US); James Nicholas Vines, San Francisco, CA (US)

(73) Assignee: Redwood Robotics, Inc., San Francisco, CA (US)

( * ) Notice: Subject to any disclaimer, the term of this patent is extended or adjusted under 35 U.S.C. 154(b) by 100 days.

(21) Appl. No.: 14/191,831

(22) Filed: Feb. 27, 2014

(65) Prior Publication Data
US 2014/0379129 A1      Dec. 25, 2014

Related U.S. Application Data

(60) Provisional application No. 61/838,698, filed on Jun. 24, 2013.

(51) Int. Cl.
*G06F 1/16*       (2006.01)
*B25J 9/00*       (2006.01)

(52) U.S. Cl.
CPC .............. *B25J 9/0009* (2013.01); *B25J 9/0084* (2013.01); *B25J 9/0096* (2013.01)

(58) Field of Classification Search
USPC ........... 439/79, 77, 78, 485, 330, 331, 67, 74, 439/408; 700/216, 250, 254, 266, 245, 231, 700/94, 17, 258; 361/679.31, 679.29, 361/679.32, 679.47, 679.33, 679.54, 361/679.02, 679.46, 679.5, 679.08, 679.27, 361/679.21, 679.41, 679.56; 320/109, 103, 320/115, 113, 108, 101, 107; 455/557, 455/41.1, 73, 444, 422.1, 453
See application file for complete search history.

(56) References Cited

U.S. PATENT DOCUMENTS 8,965,561 B2 *   2/2015   Jacobus et al. ................ 700/216
2006/0111813 A1   5/2006   Nishiyama
(Continued)

FOREIGN PATENT DOCUMENTS

WO    WO 03/061830    7/2003
WO    WO 2010/043640   4/2010

OTHER PUBLICATIONS

International Search Report and Written Opinion prepared by the European Patent Office in International Application Serial No. PCT/US2014/043642, mailed Oct. 28, 2014.
(Continued)

*Primary Examiner* — Hung Duong
(74) *Attorney, Agent, or Firm* — McDonnell Boehnen Hulbert & Berghoff LLP

(57) ABSTRACT

An example modular reconfigurable workcell for quick connection of peripherals is described. In one example, a modular reconfigurable workcell comprises modular docking bays on a surface of the workcell that support attachment of docking modules in a fixed geometric configuration, and respective modular docking bays include electrical connections for a variety of power and communication busses of the docking modules to be attached. The workcell also includes an electrical subsystem for coupling the communication busses between the modular docking bays and providing power circuitry to the modular docking bays, and structural features in the modular docking bays to enable insertion of the docking modules in the fixed geometric configuration. The workcell also includes a processor for determining a geometric calibration of attached peripherals based on a location and the orientation of corresponding docking modules attached to the modular docking bays and based on an identification of the attached peripherals.

20 Claims, 11 Drawing Sheets

(56) References Cited

U.S. PATENT DOCUMENTS

2009/0246081 A1    10/2009  Nichols et al.
2010/0308768 A1*   12/2010  Dower .......................... 320/109
2012/0087078 A1*    4/2012  Medica et al. ........... 361/679.31
2014/0265359 A1*    9/2014  Cheng et al. ................. 292/144
2014/0277691 A1*    9/2014  Jacobus et al. ............... 700/216

OTHER PUBLICATIONS

International Preliminary Report on Patentability and Written Opinion prepared by the European Patent Office in International Application Serial No. PCT/US2014/043642, mailed Jan. 7, 2016.

* cited by examiner

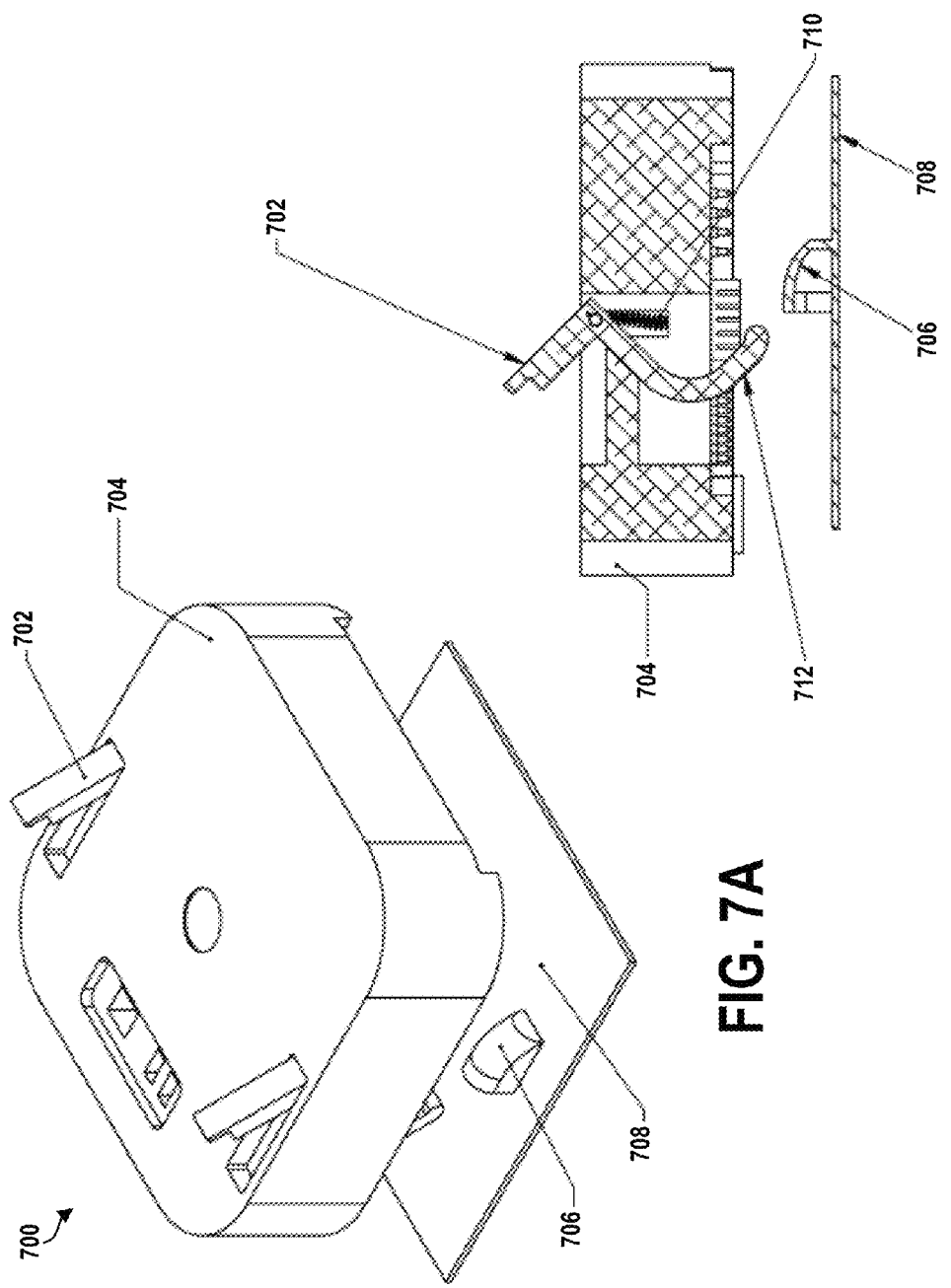

MODULAR RECONFIGURABLE WORKCELL FOR QUICK CONNECTION OF PERIPHERALS

CROSS-REFERENCE TO RELATED APPLICATION

The present application claims priority to U.S. patent application Ser. No. 61/838,698, filed on Jun. 24, 2013, the entire contents of which are herein incorporated by reference.

BACKGROUND

Unless otherwise indicated herein, the materials described in this section are not prior art to the claims in this application and are not admitted to be prior art by inclusion in this section.

A workcell provides a mounting structure to attach robot peripherals, such as sensors, actuators, arms, computers, and power supplies. Usually, a technician integrates these peripherals to create a custom workcell solution to solve a specific task. This integration effort includes mechanically installing robot peripherals into the workcell, wiring these devices together, describing their configuration within an automation controller, and then calibrating a geometric location of these devices relative to each other and to the world.

This integration process can be time consuming and expensive. If it is desired to modify the workcell functionality, much of this integration effort is repeated. In addition, workcells often may not be able to be reconfigured since the workcells are usually customized for a specific task or requirement. A high cost of modification may also make it undesirable to swap out older or damaged devices.

SUMMARY

In one example, a modular reconfigurable workcell is provided that comprises one or more modular docking bays on a surface of the workcell that support attachment of one or more docking modules in a fixed geometric configuration, and respective modular docking bays include a plurality of electrical connections for a variety of power and communication busses of the one or more docking modules to be attached. The one or more docking modules provide an electrical and mechanical interface between a respective peripheral and the workcell. The workcell also includes a backplane for coupling the communication busses between the one or more modular docking bays and providing power circuitry to the one or more modular docking bays, one or more structural features in the one or more modular docking bays to enable insertion of the one or more docking modules in the fixed geometric configuration such that an orientation of the one or more docking modules relative to the workcell is uniquely defined, and a processor for determining a geometric calibration of attached peripherals based on a location and the orientation of corresponding one or more docking modules attached to the one or more modular docking bays and based on an identification of the attached peripherals of the corresponding one or more docking modules.

In another example, a modular reconfigurable workcell is provided that comprises one or more modular docking bays on a surface of the workcell that support attachment of docking modules in a fixed geometric configuration, and respective modular docking bays include a plurality of electrical connections for a variety of power and communication busses of the docking modules to be attached. The workcell also comprises one or more docking modules inserted within the one or more modular docking bays, and the one or more docking modules provide an electrical and mechanical interface between a respective peripheral and the workcell. The workcell also comprises a processor for determining a geometric calibration of attached peripherals based on a location and an orientation of corresponding one or more docking modules attached to the one or more modular docking bays and based on an identification of the attached peripherals of the corresponding one or more docking modules.

In another example, a modular reconfigurable workcell is provided that comprises an enclosure including one or more modular docking bays on a surface of the enclosure that support attachment of docking modules in a fixed geometric configuration, and respective modular docking bays include a plurality of electrical connections for a variety of power and communication busses of the docking modules to be attached. The enclosure further includes a backplane for coupling the communication busses between the one or more modular docking bays and providing power circuitry to the one or more modular docking bays. The workcell also includes one or more docking modules inserted within the one or more modular docking bays, and the one or more docking modules provide an electrical and mechanical interface between a respective peripheral and the workcell.

In still other examples, methods and computer program products including instructions executable by a device or by one or more processors to perform functions of the methods are provided. The methods may be executable for operating a workcell, or for determining a geometric calibration of peripherals attached to the workcell.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIGS. 7A-7B illustrate insertion of an example docking module.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a reconfigurable workcell is provided that includes an enclosure that houses one or more modular docking stations. The enclosure may be sealed to an exterior environment, and able to rigidly support working forces exerted by an attached robot arm or other peripheral. The enclosure may be configured to be mounted to any surface including a worktable, floor, wall, or ceiling, for example. The enclosure includes computer and power requirements, and related devices needed for workcell functionality, and may utilizes surface of the enclosure as a work surface for a specific task.

In some examples, one or more modular docking stations are exposed on a top surface of the enclosure that support plug-and-play attachment of robot peripherals and may enable a tool-less quick connect such that the peripheral can be attached with no tools. The modular docking stations include features to prevent installation of the peripheral at an incorrect orientation, and features to ensure repeatable and precise alignment of the peripheral to the enclosure. The modular docking stations also may include features that allow for electrical connection of one or more power and communication busses to the attached peripheral without use of tools or manual electrical connectors.

Figure 1:
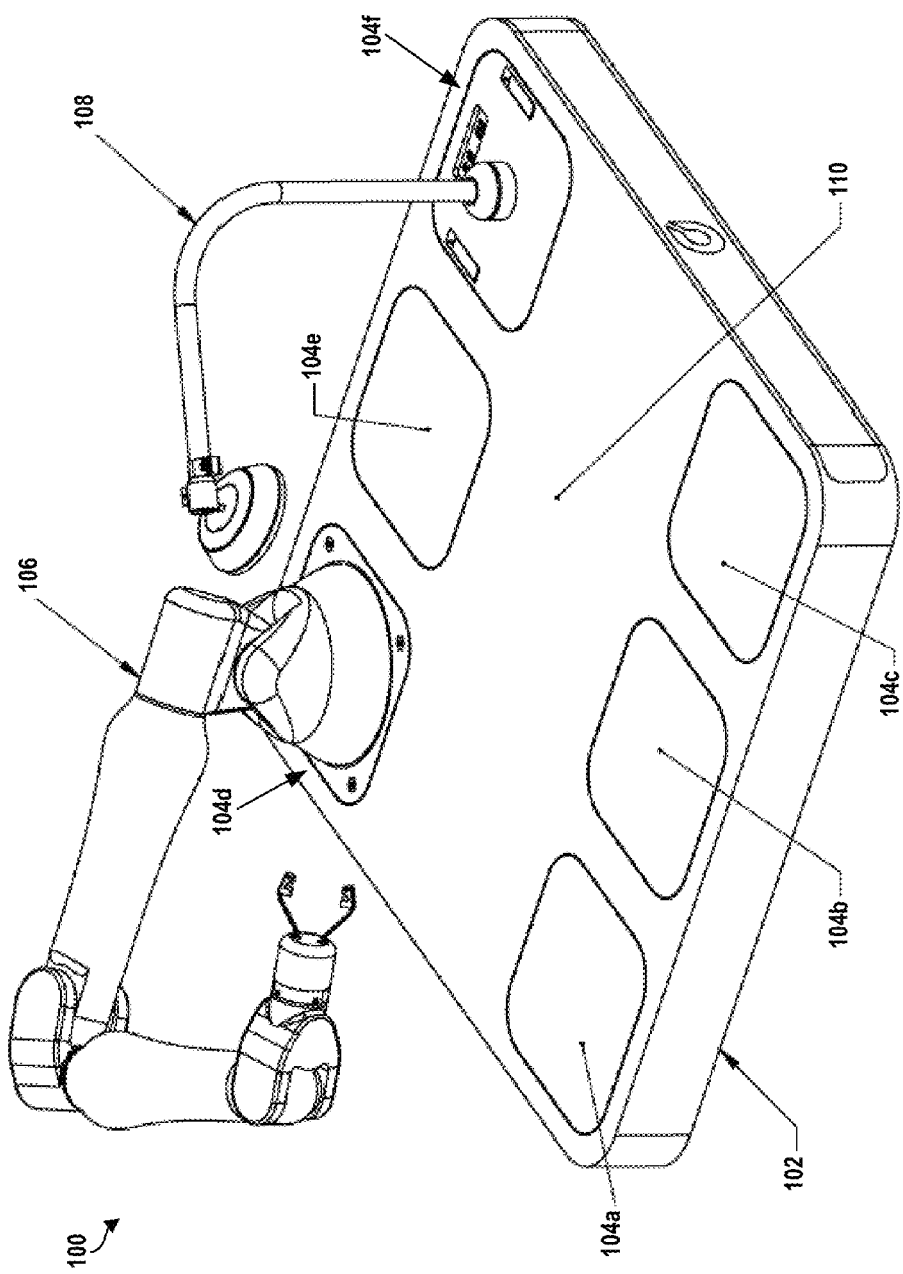
FIG. 1 illustrates an example modular reconfigurable workcell.

Referring now to the figures, FIG. 1 illustrates an example modular reconfigurable workcell 100. The workcell 100 includes an enclosure 102 with six modular docking bays 104a-f arranged in a 2×3 array. The modular docking bays 104a-f are on a surface of the enclosure 102 and support attachment of one or more docking modules in a fixed geometric configuration. The modular docking bays 104a-f include a plurality of electrical connections for a variety of power and communication busses of the docking modules to be attached, and the docking modules provide an electrical and mechanical interface between a respective peripheral and the workcell 100. As shown in FIG. 1, two modular docking bays 104d and 104f include docking modules inserted and configured with two peripheral modules that include a robot arm peripheral 106 and a camera peripheral 108, although any variety and configuration of peripherals may be achieved. Other example peripherals include a fixture for locating a device-under-assembly, and a measurement tool for measuring a device-under-inspection. In addition, other numbers and arrangements of docking stations may be chosen.

Each modular docking bay 104a-f is a location that a peripheral module can be inserted. A top of the enclosure 102 may include areas without docking stations, providing a work surface 110 for automation tasks. Because the work surface 110 is on the enclosure itself, a location of a work object and calibration may be achieved. Inclusion of areas without docking bays also creates volume inside of the enclosure 102 that is not occupied with docking bay hardware. This volume may be used for internal subsystems.

As shown in FIG. 1, modular docking bays that do not have docking modules inserted, such as the modular docking bays 104a, 104b, 104c and 104e, may each include a cover installed to seal the docking bays if a peripheral is not present.

Figure 2A:
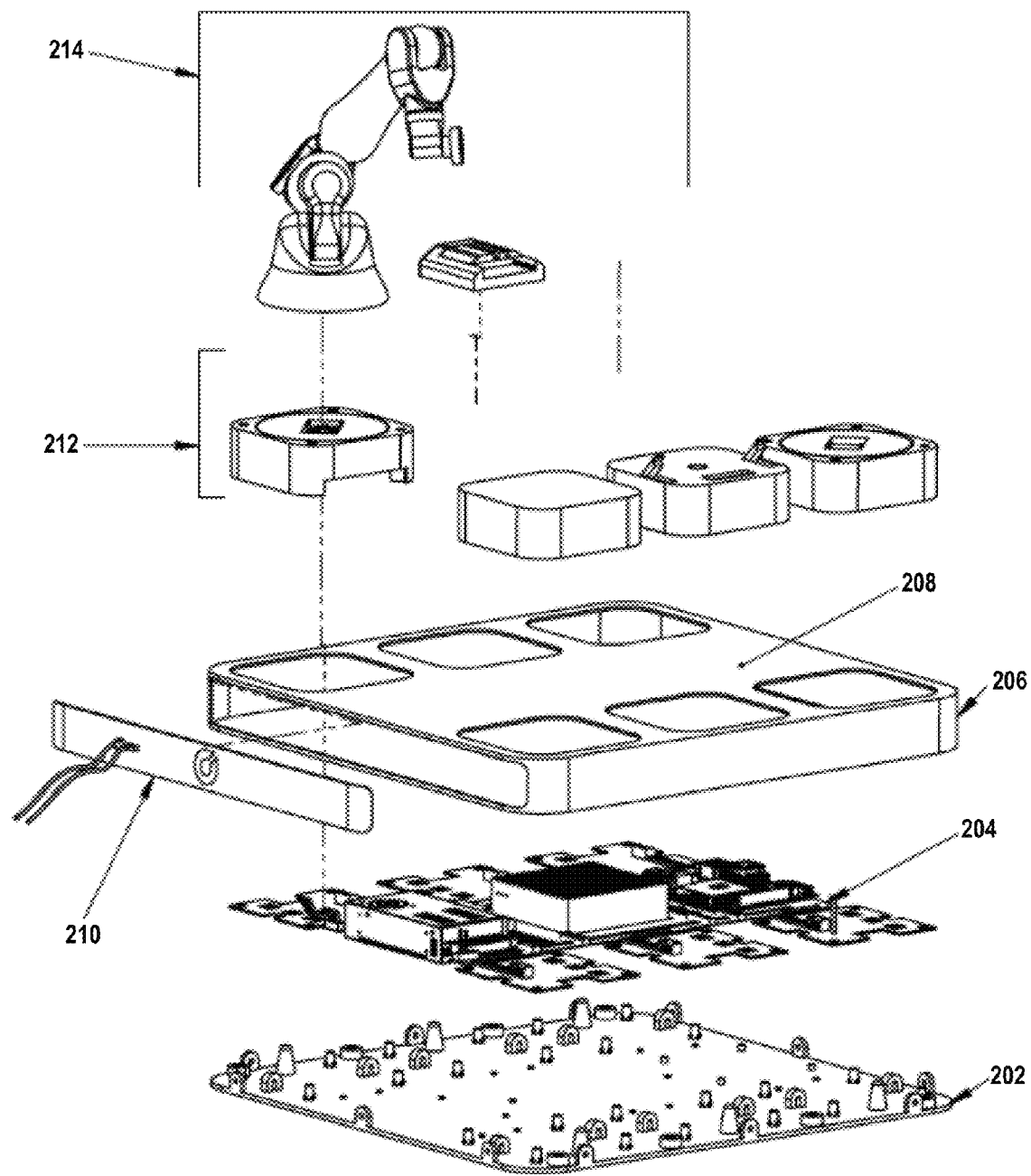
FIG. 2A illustrates an exploded view showing an example of an internal structure of an enclosure.

FIG. 2A illustrates an exploded view showing an example of an internal structure of an enclosure. The enclosure includes a bottom plate 202 that may include features for mechanically attaching peripherals. The bottom plate 202 may act as a structural element, allowing a mechanically attached peripheral to pass a load to a mounting surface of the enclosure. The bottom plate 202 may also provide features for mounting an electrical subsystem or backplane 204. The backplane 204 electrical subsystem may include computers, power supplies, and electronics that interface attached peripherals to the computers. The backplane 204 may couple communication busses between modular docking bays and provide power circuitry to the modular docking bays. The backplane 204 may be considered an electrical subsystem and may comprise or be a wire harness.

The enclosure also includes side plates 206 and a top plate 208 which form the enclosure when attached to the bottom plate 202. The enclosure may be sealed to prevent ingress of unwanted dust, liquid, or other environmental elements. The top plate 208 has identical holes cut into the top plate 208 to accommodate each docking bay.

A back panel 210 provides electrical connections for power and communication between the backplane electrical subsystem 204 and an external source. Docking modules, such as docking module 212, may be inserted into each docking bay. The docking module 212 provides an electrical and mechanical interface for integrating a wide variety of peripherals, such as the robot arm 214 to the enclosure.

Figure 2B:
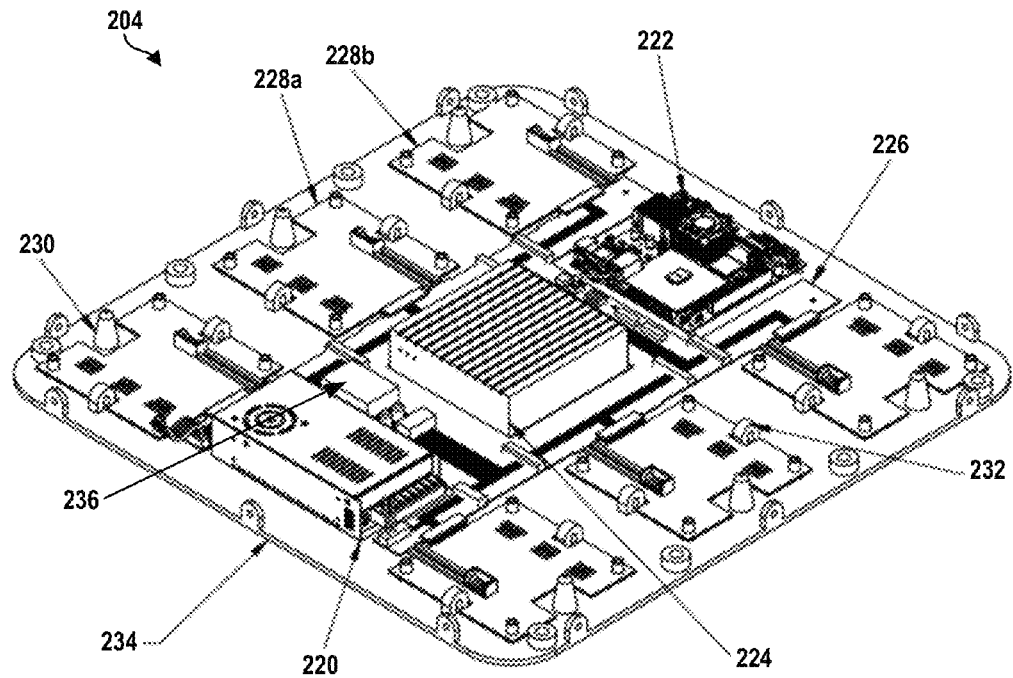
FIG. 2B illustrates an example backplane with attached subsystems.

FIG. 2B illustrates an example backplane electrical subsystem 204 with attached subsystems. The subsystems provide functionality required for the workcell. The subsystems may include a power supply 220, a control processor 222 for handling real-time control of robot arm peripherals, a task processor 224 for handling non real-time tasks, and a central backplane printed circuit board (PCB) 226 that provides electrical interconnects between one or more dock station PCBs 228a-b and the processors 222 and 224.

The backplane PCB 226 may include functionality for multiplexing communication busses, bus hubs or switches, power management circuitry, or computational resources. Each modular docking bay has an identical form factor. The dock station PCBs 228a-b may attach to the backplane PCB 226 by card edge connectors, by a wire harness, or by being part of the backplane itself. The backplane 204 may further include features for attachment and registration of docking modules. One or more tapered posts 230, latch hooks 232, or threaded extrusion features can act as a mechanical interface between a bottom plate 234 of the backplane 204 and a docking module, for example.

The backplane 204 may further include an inertial measurement unit (IMU) 236 to determine an acceleration experienced by the workcell, for example. The IMU 236 may monitor for abnormal accelerations imparted to the backplane 204. Abnormal accelerations can be an indication of a malfunctioning arm peripheral or unexpected contact with a person or other machinery. In some examples, upon detection of an abnormal acceleration, the workcell can operate in a safety fault mode. In addition, the IMU 236 can provide an orientation of the backplane 204 with respect to gravity. Some peripherals, such as a robot arm, can benefit from knowledge of a gravity vector to accomplish gravity compensation based control. The IMU 236 may output the control processor 236, which may receive the acceleration and determine an indication of a malfunctioning peripheral or contact of a peripheral with another element.

Figure 2C:
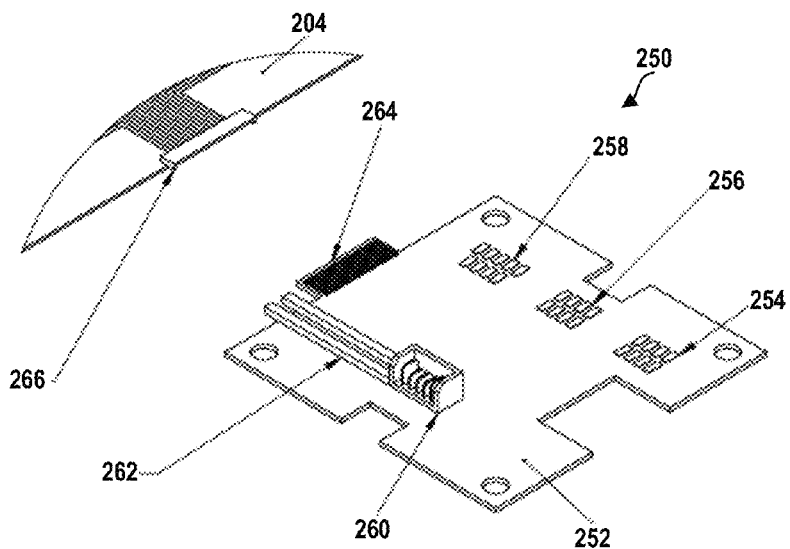
FIG. 2C illustrates an example docking station PCB that interfaces electrical signals from the backplane to a docking module.

FIG. 2C illustrates an example docking station PCB 250 that interfaces electrical signals from the backplane 204 to a docking module. The docking station PCB 250 includes a PCB 252 with one or more locations for quick electrical connect receptacles 254, 256, 258, and 260 placed such as to make an electrical connection to a corresponding connector on a docking module when a peripheral is inserted. The receptacles may be exposed foil pads, such as receptacles 254, 256, and 258, blade connectors, such as receptacles 260, or related spring electrical quick connect features. The docking station PCB 250 includes registration features to ensure precise and repeatable installation inside the enclosure. The docking station PCB 250 may include power bus bars 262 for a power bus. A PCB edge connector 264 may be employed to connect the docking station PCB 250 to a corresponding connector 266 on the central backplane PCB 204.

Figure 2D:
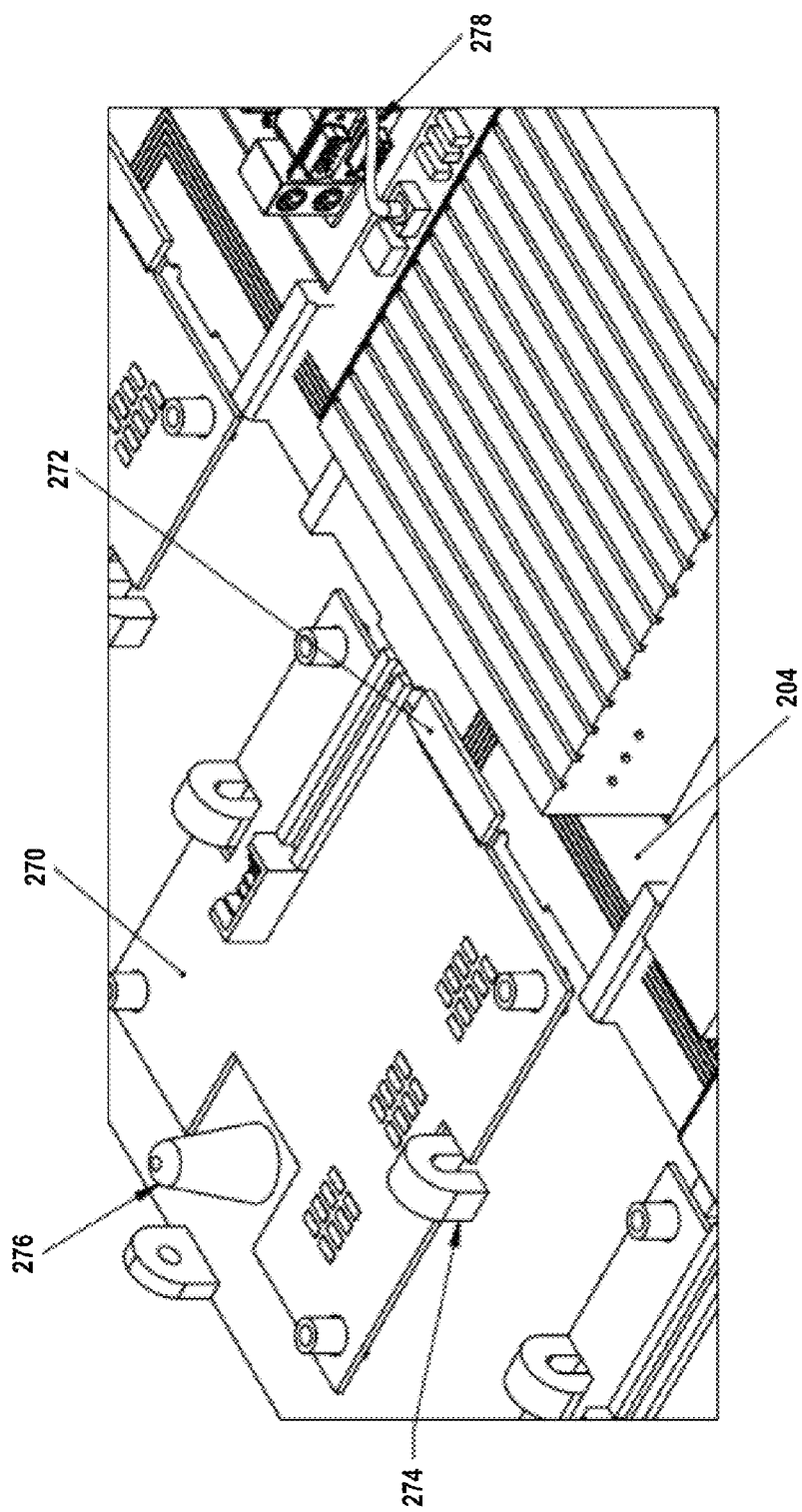
FIG. 2D illustrates a detailed view of a dock station PCB installed in the enclosure.

FIG. 2D illustrates a detailed view of a dock station PCB 270 installed in the enclosure. The dock station PCB 270 includes a card edge connector 272 attaching to the central backplane PCB 204. Also shown are mechanically connection hooks 274 and a tapered post 276 to ensure alignment during peripheral installation. The backplane PCB 204 may also provide power and communications to attached computers 278.

Thus, as shown in FIGS. 2A-2D, the workcell includes a processor in the enclosure, and one or more modular docking bays couple to one or more docking modules through the backplane and via a printed circuit board (PCB) card edge connector or a wire harness. The modular docking bays include a variety of electrical connections, such as Ethernet, Firewire, CANBUS, and USB connections, to couple to the docking modules. The enclosure further includes a power supply and a central backplane circuitry board that provides electrical interconnects between the one or more docking modules and the power supply and between the one or more docking modules and the processor. The enclosure all the one or more modular docking bays to be accessible through a surface of the workcell, and may be sealed to an outside environment.

Within examples, the workcell shown in FIGS. 2A-2D enables co-locating a peripheral with a power and control system in one enclosure to avoid a need for a connection wiring harness.

Figure 3:
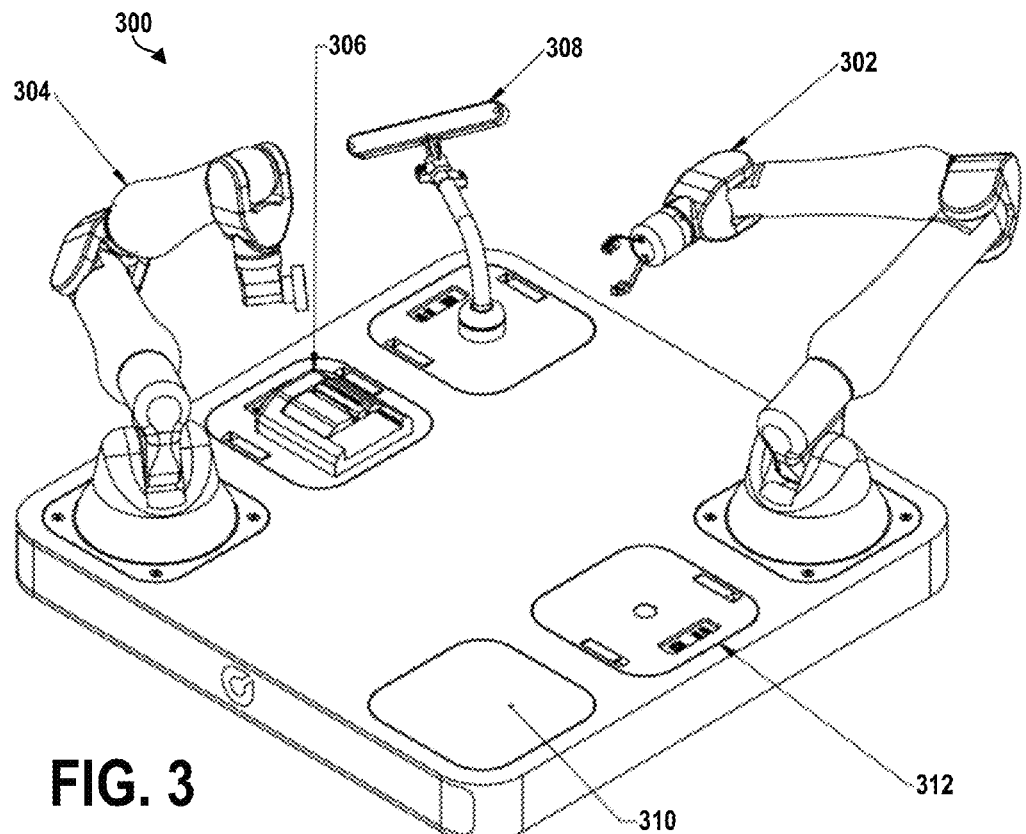
FIG. 3 illustrates an example modular reconfigurable workcell.

FIG. 3 illustrates an example modular reconfigurable workcell 300. The workcell 300 includes different peripherals installed in each docking bay including a seven degree of freedom (DOF) arm peripheral with gripper 302, a seven DOF arm peripheral with camera 304, a test device peripheral for assessing device-under-test functionality 306, a 3D sensor peripheral for measuring a location of a device-under-assembly 308, a docking bay cover 310, and an expansion input/output (I/O) peripheral 312 for interfacing to external devices such as test machines, PLCs, and safety guards. Any of the peripherals may be inserted within any docking bays and configured as desired for a specific application or task. Within examples, each modular docking bay is identical, and docking bays without inserted docking modules and peripherals may include the cover 310 cover secured over the modular docking bay to provide a uniform working surface and protect the electrical subsystem.

Figure 4:
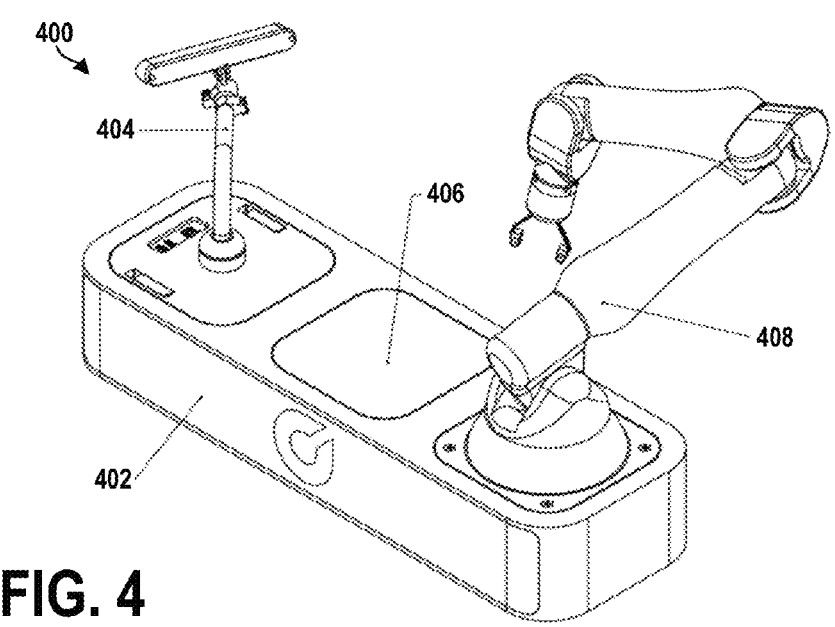
FIG. 4 illustrates another example modular reconfigurable workcell.

FIG. 4 illustrates an example modular reconfigurable workcell 400. The workcell is configured to include a 1×3 array of docking bays. In this configuration, the workcell 400 includes an enclosure 402 that has two internal layers such that internal computers, power supplies, and electronics may be positioned underneath each docking bay. In this example, an intermediate plate can be used for peripherals 404, 406, and 408 to dock to. An internal support structure can then transfer load to a base plate, for example.

Thus, within examples, workcells may be provided including modular docking bays arranged in an M×N array (e.g., 2×3 as shown in FIG. 1), and power circuitry and other computers can be arranged between rows of the modular docking bays. In other examples, workcells may be provided including modular docking bays arranged in a 1×M array (e.g., 1×3 as shown in FIG. 4), and power circuitry and computers can be arranged underneath a row of the modular docking bays.

In further examples, additional peripherals may include a sliding mechanism that couples between two docking modules, and another peripheral may attach to the slide to move from one docking bay to another. In this manner, the workcell may be positioned next to a conveyer belt, and a peripheral may move alongside the conveyer belt. Thus, multiple modules may be coupled together with a slide to combine two modules and extend a reach of one or more peripherals. The modules would be able to exchange geometry information with each other and the slide to perform calibration, for example.

Figure 5:
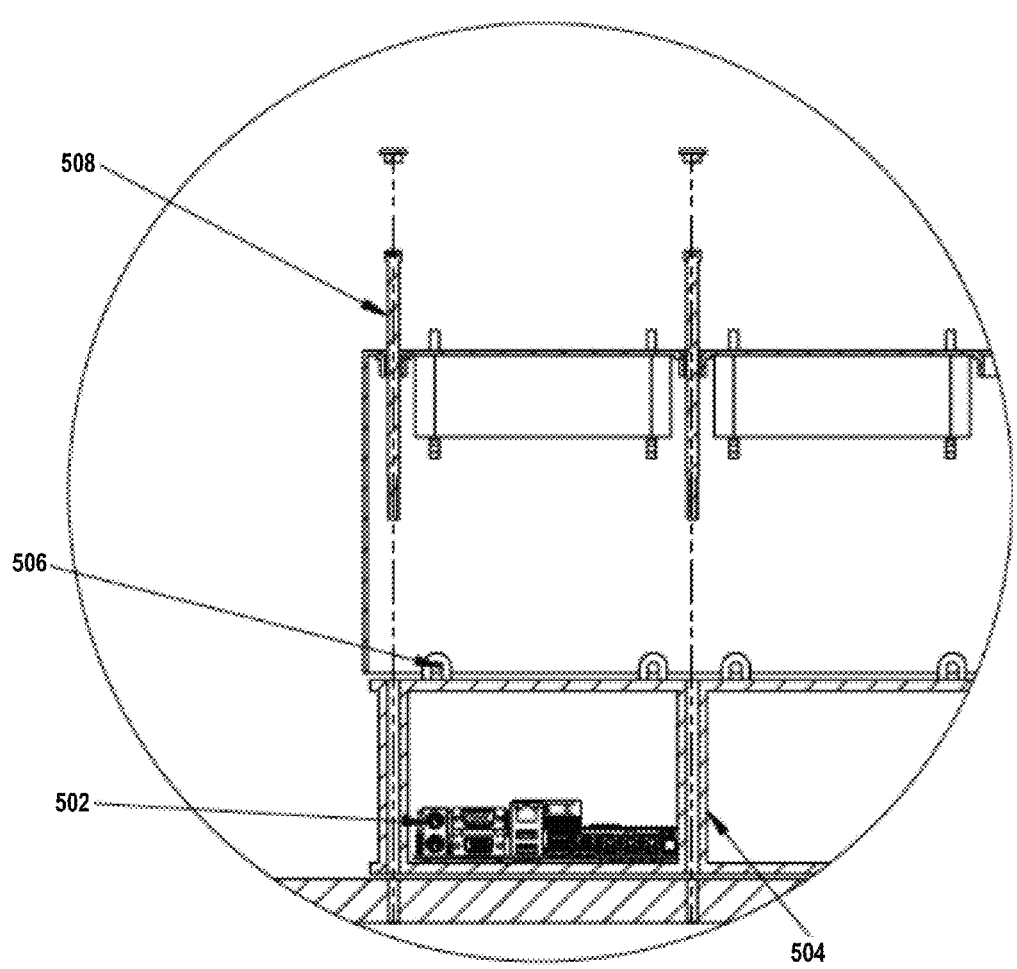
FIG. 5 illustrates an example two layer construction of an enclosure to support a 1×3 arrangement of docking bays and similar arrangements.

FIG. 5 illustrates an example two layer construction of an enclosure to support a 1×3 arrangement of docking bays and similar arrangements. In FIG. 5, internal electronics 502 within a lower layer are provided and constructed within a rigid metal frame 504. A docking module mounting plate 506 is attached to a top of the metal frame 504 such that docking modules can be attached to the docking module mounting plate 506 with bolts 508 or a similar mechanism.

Figures 6A, 6B:
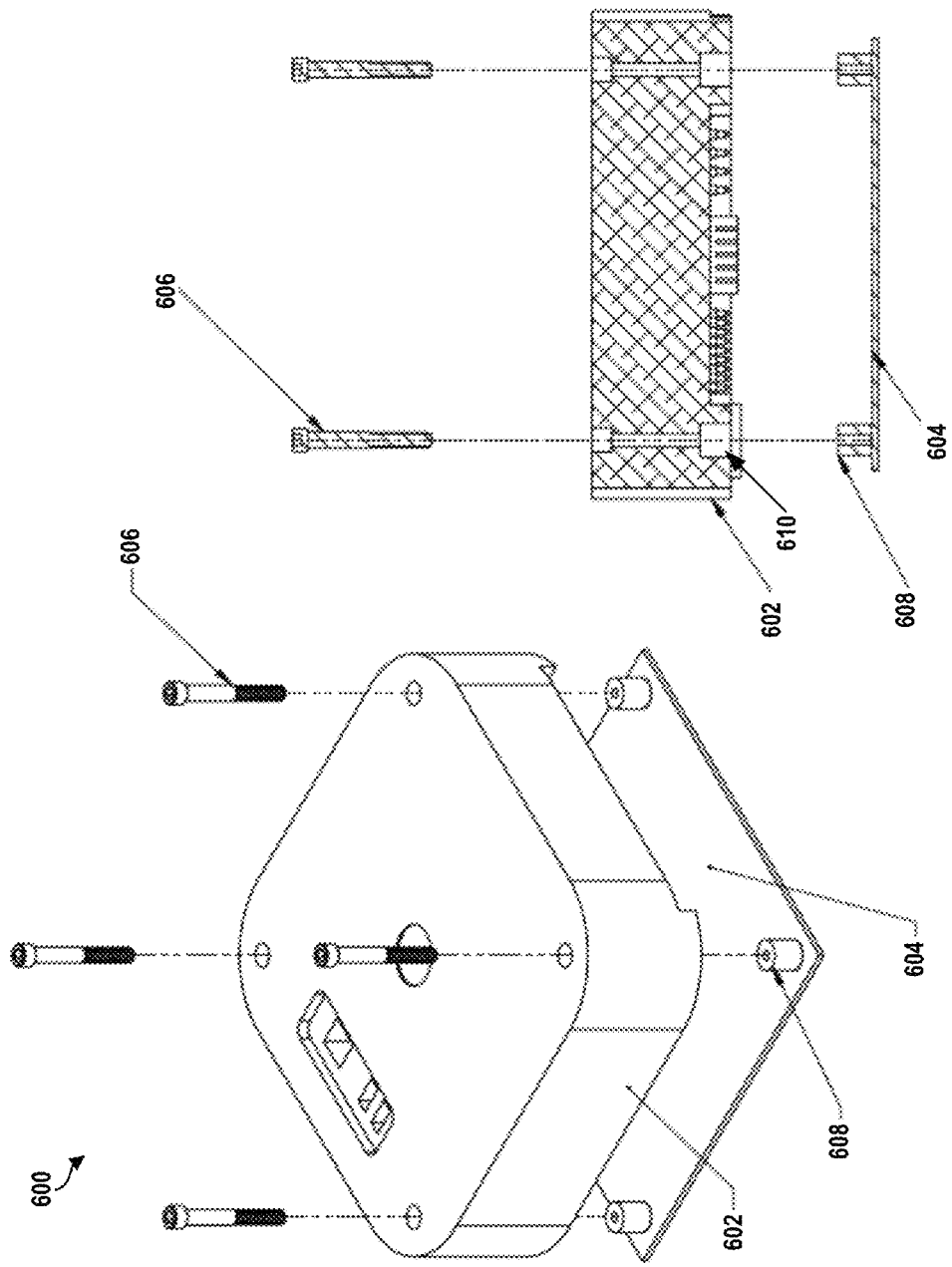
FIGS. 6A-6B illustrate a top and cross-sectional view of an example docking module 600.

FIGS. 6A-6B illustrate a top and cross-sectional view of an example docking module 600. The docking module 600 functions as an electrical and mechanical interface between a peripheral and the enclosure. The docking module 600 includes a housing 602 that transfers load from a peripheral to a bottom plate 604 of the enclosure. If the peripheral can produce high loads, such as with a robot arm, the housing 602 may be a rigid metal. If the peripheral produces lighter loads, such as with a camera, the housing 602 may be an injection molded plastic. Alternatively, the peripheral load may be transferred to the mounting surface through the enclosure shell. In this example, the enclosure side plates may be extruded, machined, cast, or sheet metal.

The docking module 600 may be inserted through a top of a base of a workcell along a single direction. The docking module 600 may be attached with one or more bolts 606 that screw into threaded features in the bottom plate 604. Each threaded feature may include an extended boss 608 that acts to precisely align the docking module 600 to the bottom plate 604 and to provide load transfer between the docking module 600 and the bottom plate 604. The boss 608 may include a taper to allow for initial alignment.

A threaded feature on the bottom plate 604 may form a precise slip fit with a receptacle 610 on the housing 602, as shown in FIG. 6B, to precisely align the docking module 600. Within examples, non-symmetric spacing of these features ensures that there is only one achievable insertion orientation.

Attachment and registration features of the housing 600, such as the receptacle 610, act to provide handedness such that a pose and orientation of the docking module 600 relative to the bottom plate 604 is precisely and uniquely defined. This allows a geometric calibration of an attached peripheral to be specified at design time up to a precision of a manufacturing process. Thus, the receptacle 610 may be a structural feature in the docking module 600 that aligns with the boss 608 structural feature of the modular docking bays to enable insertion of the docking module 600 in the fixed geometric configuration such that an orientation of the docking module 600 relative to the workcell is uniquely defined.

FIGS. 7A-7B illustrate insertion of an example docking module 700. The docking module 700 may be inserted using a tool-less method, for example. In this example, one or more lever arms 702 on a housing 704 of the docking module 700 engage with hooks 706 attached to a mounting plate 708. When the lever arm 702 is engaged with the hook 706, a constant clamping force is generated between the docking module 700 and the mounting plate 708. This force can be generated using a spring 710 or by using an over center cam contour 712 in the lever arm 702. The spring 710 allows the lever arm to flip into an up position when the docking module 700 is detached. Other mechanisms can be used to generate a same effect of creating a rigid connection by a constant pressure between the docking module 700 and the mounting plate 708.

Figure 8:
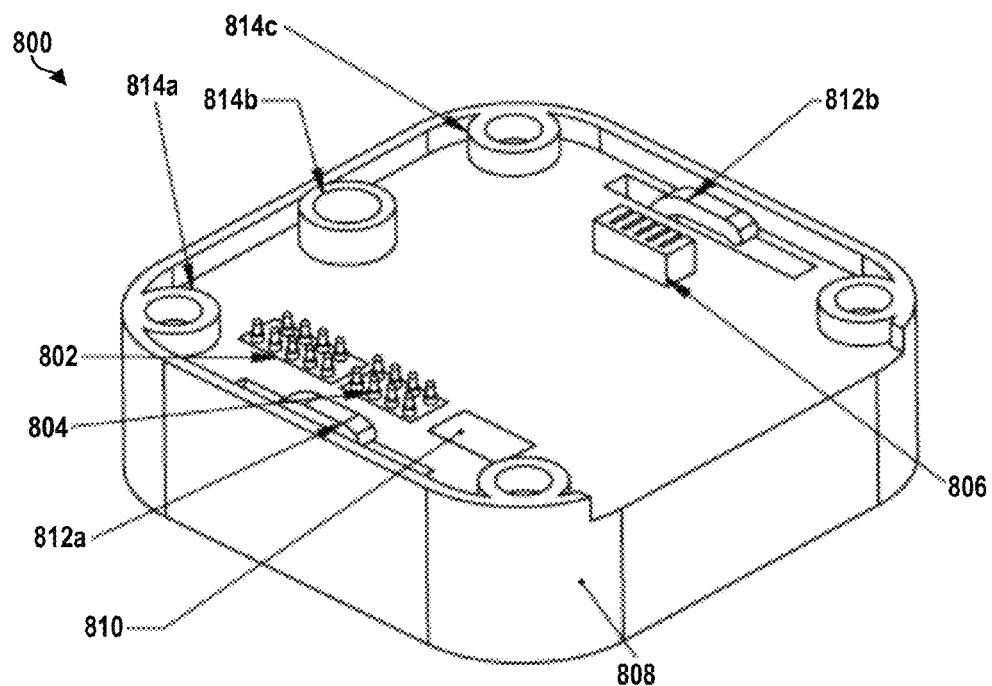
FIG. 8 illustrates a bottom view of an example docking module.

FIG. 8 illustrates a bottom view of an example docking module 800. The docking module 800 enables electrical quick connections between peripheral electronics and enclosure electronics. To achieve an electrical quick connection, spring loaded pin connectors 802 and 804 (e.g., pogo pins) may be used to contact against foil of a rigid PCB. Alternatively, a metal blade connector 806 can be used that inserts into a mating receptacle. Other similar quick connect technologies can be employed that enable appropriate tolerance to misalignment during module insertion.

The docking module 800 including a housing 808 with includes a PCB that provides the quick-connect connectors 802, 804, 806, and 810. Each connector is routed on the PCB or wiring harness to internal electronics of the peripheral. A location and function of each connector can be a fixed according to an electrical interface specification. This allows for modular connection of a range of peripheral devices that adhere to the electrical interface specification.

As shown in the FIG. 8, the connector 802 is a nine-pin bus, the connector 804 is an eight-pin bus, and the connector 806 is a five-blade power bus. If a peripheral does not support a particular connector functionality, a location of the connector may be left blank, as shown by the connector location 810. A docking module needs to only populate pins for the communication and power busses that are required for that specific module. A geometric arrangement is such that absence of a connector's spring pins results in no electrical connection being made to the peripheral for that particular bus.

The docking module 800 is also shown to include features to couple to a bottom plate, such as lever arms 812*a-b*, and alignment receptacles 814*a-c*. The alignment receptacles 814*a-c* may align with extended bosses within which screws can be inserted to fasten the docking module to the bottom plate, for example.

Figure 9:
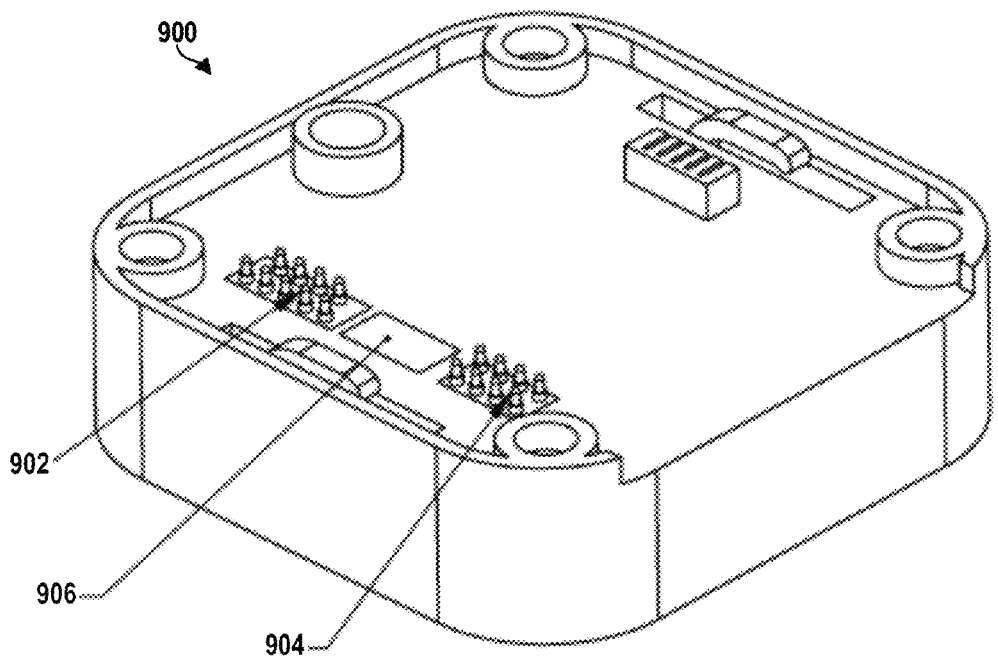
FIG. 9 illustrates a bottom view of another example docking module.

FIG. 9 illustrates a bottom view of another example docking module 900. In FIG. 9, an alternate spring connector configuration is provided for the docking module 900. In this configuration, a peripheral supports a nine-pin bus 902 and an eight-pin bus 904 as well as a power bus. Another bus location 906 is not supported, and is left blank. Thus, docking modules can provide different types of buses, and by populating different component locations of the docking modules, a customized connection can be implemented for a specific peripheral.

Figure 10:
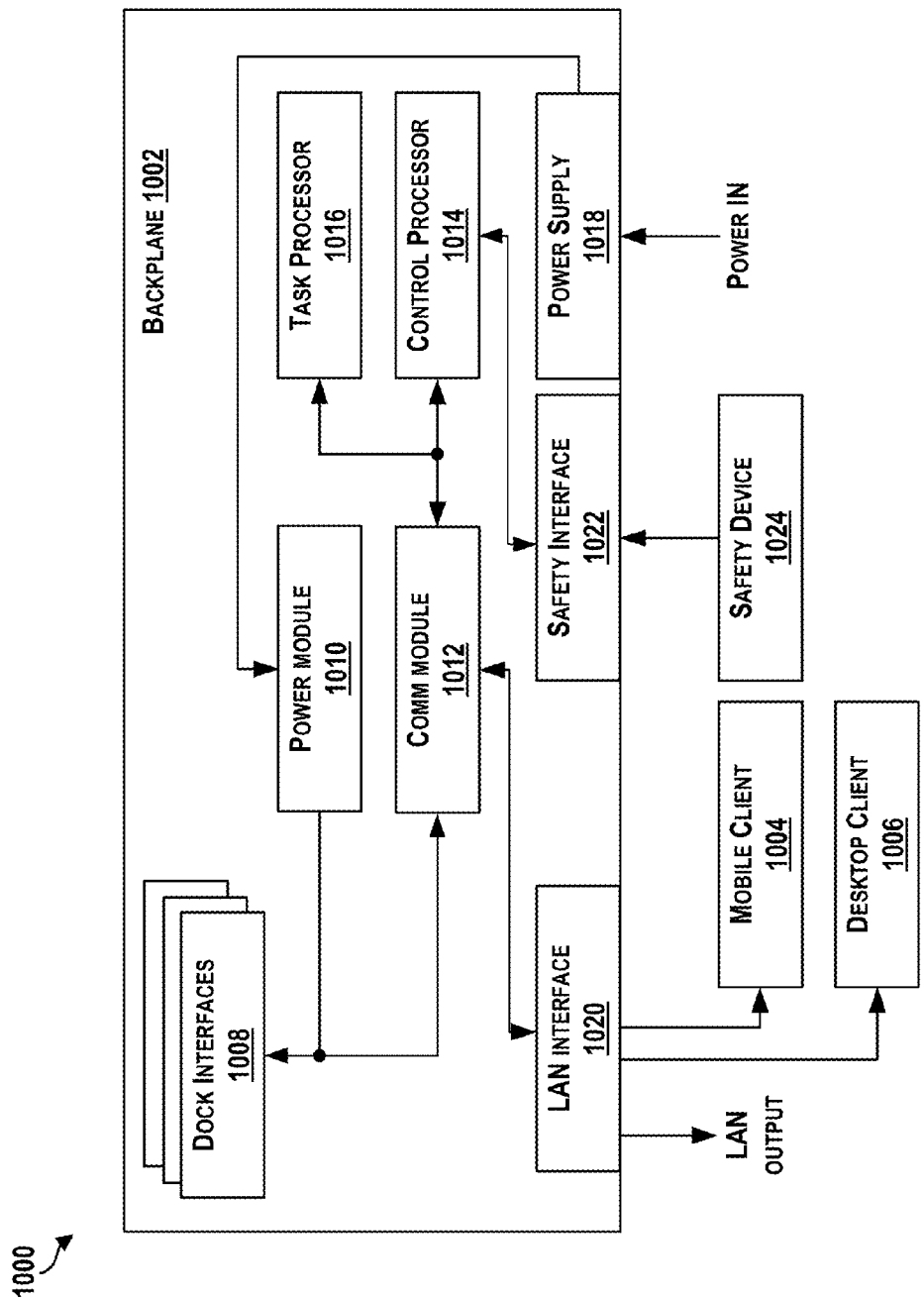
FIG. 10 is a block diagram illustrating example functional architecture of components of a workcell.

FIG. 10 is a block diagram illustrating example functional architecture of components of a workcell 1000. The workcell includes a backplane electrical subsystem 1002 that couples to clients, such as a mobile client 1004 and a desktop client 1006, or other integrated displays and input devices that provide graphical user interfaces to allow a user to configure and program the workcell 1000. For instance, the mobile client 1004 may be a tablet device that communicates wirelessly with the workcell 1000.

The backplane 1002 includes modular bay dock interfaces 1008, a power module 1010, a communication module 1012, a control processor 1014, a task processor 1016, a power supply 1018, a local area network (LAN) interface 1020, and a safety interface 1022.

The backplane 1002 provides electrical interconnection of the dock interfaces 1008, the power module 1010, the communication module 1012, and CPUs 1014 and 1016. The backplane 1002 may comprise one or more interconnected PCBs. The modular bay dock interfaces 1008 enable a docking module to couple to the workcell 1000. For example, the dock interface 1008 provides digital communication, power, and mechanical attachment to attached peripherals, and may define electrical, mechanical, and software standards required of all compatible peripherals.

The power module 1010 distributes power from the power supply 1018 to each dock interface 1008 and processor 1014 and 1016. The power module 1010 may include power monitoring, soft start, safe shutdown, and uninterruptable power supply features. The power supply 1018 may convert battery or line (AC) power to generate one or more supply voltages required to power the connected peripherals and the on-board computers.

The communication module 1012 may route communication bus signals from each dock interface 1008 to network interfaces of the CPUs and LAN. The communication module 1012 may comprise one or more USB, EtherCAT, Ethernet hubs, switches, or crossover pass through, as well as other common bus types. The LAN interface 1020 provides a wired or wireless networked connection from the backplane 1002 to other devices.

The control processor 1014 provides deterministic real-time control of one or more actuated devices, and communicates on a real-time control bus (such as EtherCAT) to each dock interface 1008. The task processor 1016 provides task execution services, computation for sensing and perception, data management and analytics services, non real-time control of actuated devices, and network interfaces (USB, Ethernet) to external devices. The task processor 1016 and control processor 1014 may be separate cores on one CPU, a single core, or separate cores on separate computers, as desired.

The safety interface 1022 provides electrical and mechanical connection of an external safety device 1024 (such as an emergency-stop) to the backplane 1002.

The workcell 1000 may be provided in an enclosure, and a top plate of the enclosure functions as a calibrated work surface for an automation task. The work surface may include mounting points for attaching stationary items to enable the task, such as assembly jigs.

To kinematically register a docking module to the enclosure, any number of methods may be used. One method includes engaging three pins in the bottom plate of the backplane 1002 into three slots in the docking module housing. This uniquely and precisely constrains an orientation of the module with respect to the bottom plate when installed.

The workcell 1000 may include features to seal the enclosure when a peripheral is installed. For example, a gasket or rubber o-ring can be attached to the peripheral docking module bottom side. The enclosure top plate has a mating lip feature. When the module is installed, a clamping force of the module to the enclosure bottom plate causes the gasket to form a seal between the peripheral and the top plate.

The workcell 1000 may be attached to a flat surface such as a table, wall, or ceiling. The bottom plate may include through-hole features such that a bolt from above may attach the bottom plate to the surface. A removeable plug seal may be employed to access an attachment feature yet keep the enclosure sealed. Conversely, the bottom plate may include thread hole features such that a bolt from below may pull the bottom plate into the surface.

The workcell 1000 can include lighting (LED) and speakers to provide feedback to a user during operation and during configuration. These modalities can be used to notify a user of a malfunction or that the workcell 1000 is in operation. These modalities can also be used to enhance a user experience. For example, an audible 'click' can be generated whenever a peripheral is plugged in and successfully interrogated.

Figure 11:
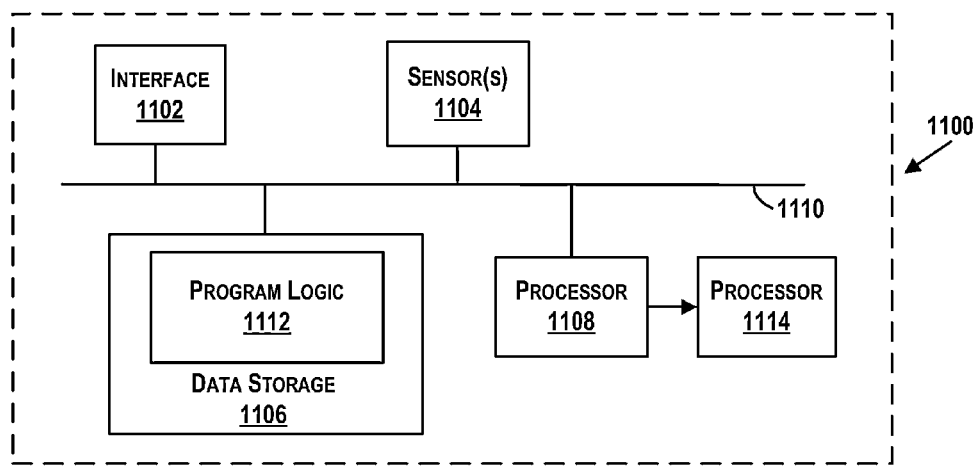
FIG. 11 illustrates a schematic drawing of an example computing device.

Many components of the workcell 1000 may take the form of a computing device, such as illustrated in FIG. 11, which illustrates a schematic drawing of an example computing device 1100. In some examples, some components illustrated in FIG. 11 may be distributed across multiple computing devices. However, for the sake of example, the components are shown and described as part of one example device 1100. The device 1100 may be or include a mobile device, desktop computer, tablet computer, or similar device that may be configured to perform the functions described herein.

The device 1100 may include an interface 1102, sensor(s) 1104, data storage 1106, and a processor 1108. Components illustrated in FIG. 11 may be linked together by a communication link 1110. The communication link 1110 is illustrated as a wired connection; however, wireless connections may also be used. The device 1100 may also include hardware to enable communication within the device 1100 and between the device 1100 and another computing device (not shown), such as a server entity. The hardware may include transmitters, receivers, and antennas, for example.

The interface 1102 may be configured to allow the device 1100 to communicate with another computing device (not shown), such as a server. Thus, the interface 1102 may be configured to receive input data from one or more computing devices, and may also be configured to send output data to the one or more computing devices. The interface 1102 may also be configured to receive input from and provide output to a torque controlled actuator, modular link of a robot arm, or other peripheral of a docking module, for example. The interface 1102 may include a receiver and transmitter to receive and send data. In other examples, the interface 1102 may also include a user-interface, such as a keyboard, microphone, touchscreen, etc., to receive inputs as well.

The sensor 1104 may include one or more sensors, or may represent one or more sensors included within the device 1100. Example sensors include an accelerometer, gyroscope, pedometer, light sensors, microphone, camera, or other location and/or context-aware sensors that may collect data of the peripheral (e.g., motion of arm) and provide the data to the data storage 1106 or processor 1108.

The processor 1108 may be configured to receive data from the interface 1102, sensor 1104, and data storage 1106. The data storage 1316 may store program logic 1112 that can be accessed and executed by the processor 1108 to perform functions executable to determine instructions for operation of the robot arm. Example functions include calibration of attached peripherals, operation of attached peripherals, safety detection functions, or other application-specific functions. Any functions described herein, or other example functions for the workcell may be performed by the device 1100 or processor 1108 of the device via execution of instructions stored on data storage 1106.

The device 1100 is illustrated to include an additional processor 1114. The processor 1114 may be configured to control other aspects of the device 1100 including displays or outputs of the device 1100 (e.g., the processor 1114 may be a GPU). Example methods described herein may be performed individually by components of the device 1100, or in combination by one or all of the components of the device 1100. In one instance, portions of the device 1100 may process data and provide an output internally in the device 1100 to the processor 1114, for example. In other instances, portions of the device 1100 may process data and provide outputs externally to other computing devices.

The computing device 1100 may be configured to determine calibrations of attached peripherals to the workcell, for example. A geometry of a work surface of the workcell is known as is a relative pose of all docking bays, mounting points, and docking modules. This knowledge enables calibration of peripherals when attached. Parts of the work surface may also be formed by the docking station covers. In one example, the processor 1108 may determine a geometric calibration of attached peripherals based on a location and the orientation of corresponding docking modules attached to the modular docking bays and based on an identification of the attached peripherals of the corresponding one or more docking modules.

An identification of the attached peripheral may be received in a number of ways. As one example, the peripheral may be attached to a workcell using an electrical connection (e.g., through a module as shown in FIGS. 8-9). In this example, data may be electrically provided that indicates information of the peripheral.

In another example, the peripheral may be attached to a module that couples to a docking bay mechanically. A set of pins or knobs may be actuated or pressed via inserted of the peripheral, and a certain combination of actuated pins or knobs may be associated with a peripheral identification. The processor 1108 may determine the set of actuated pins, and access a lookup table to determine what peripheral is associated with the actuated pins so as to mechanically identify the peripheral using no electrical communication to the peripheral or module, for example. Thus, a property of a mechanical interface may uniquely identify the peripheral and the workcell may lookup geometry information from a database that can be updated by a user. This may enable 3D-printing of custom peripherals and more dynamic extension of the workcell in the field.

In still further examples, a combination of mechanical and electrical connections and communications may be used to identify attached peripherals.

The processor 1108 may receive, from a respective attached peripheral, a description of the respective attached peripheral including geometric features of the attached peripheral upon attachment of a corresponding docking module of the respective attached peripheral to the modular docking bays. The processor 1108 can determine the geometric calibration based on the location of the one or more docking modules with respect to each other, and based on given empty modular docking bays. Thus, given a description of the peripheral, location of the peripheral inserted into the modular bay, and orientation of the docking module, the processor 1108 can determine calibration parameters of the workcell.

Calibration parameters may include distances between respective peripherals and orientations and poses between respective peripherals to enable respective peripherals to interact with each other. The configuration of the workcell and modular docking bays forces a specific orientation of attached peripherals in a limited number of ways. Using the forced constraints, the calibration parameters can be determined or identified from a known set of calibration parameters stored in memory. As an example, the known calibration parameters can be predetermined for any number of permutations of example configurations of parameters, and once the attached peripherals are identified and a location of each is determined, the stored parameter file can be accessed to determine the corresponding parameters that match a current configuration of the workcell.

Within some examples herein, operations may be described as methods for performing functions, and methods may be embodied on a computer program product (e.g., a tangible computer readable storage medium or non-transitory computer readable medium) that includes instructions executable to perform the functions.

Figure 12:
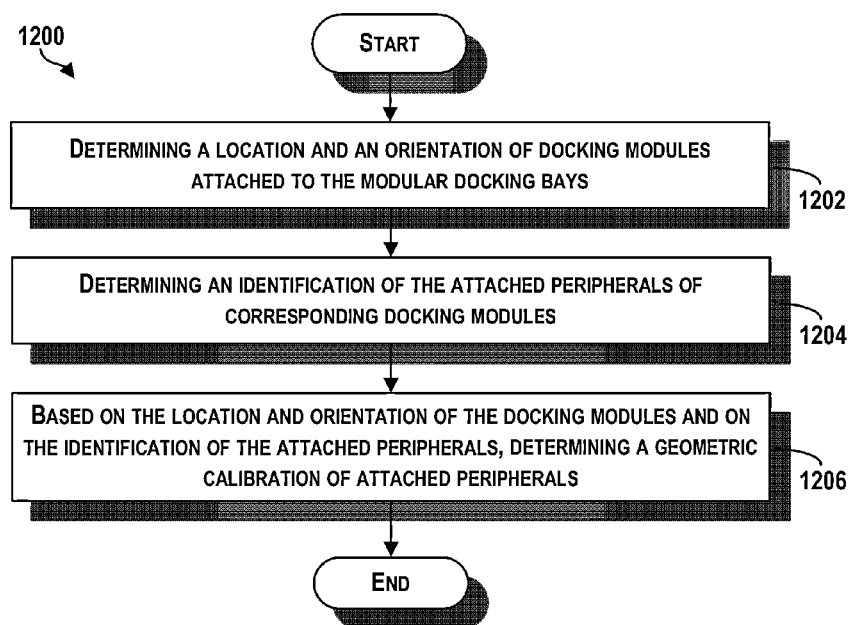
FIG. 12 is a flowchart illustrating an example method for operating a workcell.

FIG. 12 is a flowchart illustrating an example method 1200 for operating a workcell. At block 1202, the method 1200 includes determining a location and an orientation of docking modules attached to the one or more modular docking bays. At block 1204, the method 1200 includes determining an identification of the attached peripherals of the corresponding one or more docking modules. At block 1206, the method 1200 include based on the location and orientation of the docking modules and on the identification of the attached peripherals, determining a geometric calibration of attached peripherals.

Many example modular reconfigurable workcells have been described including various components. One example workcell includes multiple modular docking bays on a surface of the workcell that support attachment of multiple docking modules in a fixed geometric configuration. The modular docking bays include a number of electrical connections for a variety of power and communication busses of the docking modules to be attached, and the docking modules provide an electrical and mechanical interface between a respective peripheral and the workcell. This example workcell also includes a backplane for coupling the communication busses between the modular docking bays and providing power circuitry to the modular docking bays, and structural features in the modular docking bays to enable insertion of the docking modules in the fixed geometric configuration such that an orientation of the docking modules relative to the workcell is uniquely defined. This example workcell further includes a processor for determining a geometric calibration of attached peripherals based on a location and the orientation of corresponding docking modules attached to the modular docking bays and based on an identification of the attached peripherals of the corresponding docking modules.

Another example modular reconfigurable workcell may include multiple modular docking bays on a surface of the workcell that support attachment of docking modules in a fixed geometric configuration, and respective modular docking bays include a number of electrical connections for a variety of power and communication busses of the docking modules to be attached. This example workcell include docking modules inserted within the modular docking bays, and the docking modules provide an electrical and mechanical interface between a respective peripheral and the workcell. This example workcell also includes a processor for determining a geometric calibration of attached peripherals based on a location and an orientation of corresponding docking modules attached to the modular docking bays and based on an identification of the attached peripherals of the corresponding docking modules.

A further example modular reconfigurable workcell may include an enclosure that includes modular docking bays on a surface of the enclosure that support attachment of docking modules in a fixed geometric configuration, and respective modular docking bays include a number of electrical connections for a variety of power and communication busses of the docking modules to be attached. The enclosure also include a backplane for coupling the communication busses between the modular docking bays and providing power circuitry to the modular docking bays. This example workcell includes docking modules inserted within the modular docking bays, and the docking modules provide an electrical and mechanical interface between a respective peripheral and the workcell.

Many other example different configurations of workcells may also be provided using any of the components described herein in any combination. Within examples, the workcell provides a plug and play environment to add new peripherals or change a configuration as needed. For instance, if an arm cannot reach an area needed, the arm may be moved to another open modular bay. The peripherals can describe themselves on a bus (e.g., provide dimensions, shape, functions performed, name of peripheral, etc.) such that a known geometric model of the peripherals can be determined for calibration.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A modular reconfigurable workcell comprising:
   one or more modular docking bays on a surface of the workcell that support attachment of one or more docking modules in a fixed geometric configuration, wherein respective modular docking bays include a plurality of electrical connections for a variety of power and communication busses of the one or more docking modules to be attached, and wherein the one or more docking modules provide an electrical and mechanical interface between a respective peripheral and the workcell;
   an electrical subsystem for coupling the communication busses between the one or more modular docking bays and providing power circuitry to the one or more modular docking bays;
   one or more structural features in the one or more modular docking bays to enable insertion of the one or more docking modules in the fixed geometric configuration such that an orientation of the one or more docking modules relative to the workcell is uniquely defined; and a processor for determining a geometric calibration of attached peripherals based on a location and the orientation of corresponding one or more docking modules attached to the one or more modular docking bays and based on an identification of the attached peripherals of the corresponding one or more docking modules, wherein the identification indicates geometry information of the attached peripherals on the one or more docking modules useful for determining distances between the attached peripherals, wherein the geometric calibration indicates the distances between the attached peripherals and poses of the attached peripherals that enable the attached peripherals to interact with each other.

2. The modular reconfigurable workcell of claim 1, further comprising the one or more docking modules inserted within the one or more modular docking bays, wherein the one or more docking modules include electrical connectors to couple to the one or more modular docking bays, wherein the electrical connectors include one or more of a spring loaded pin connector and a metal blade connector.

3. The modular reconfigurable workcell of claim 1, further comprising the one or more docking modules inserted within the one or more modular docking bays, wherein the one or more docking modules includes one or more lever arms to engage with the one or more structural features in the one or more modular docking bays and to create a rigid connection between the one or more docking modules and the workcell.

4. The modular reconfigurable workcell of claim 1, wherein the one or more modular docking bays couple to the one or more docking modules through the electrical subsystem and via a printed circuit board (PCB) card edge connector or a wire harness.

5. The modular reconfigurable workcell of claim 1, wherein the plurality of electrical connections include Ethernet and USB connections.

6. The modular reconfigurable workcell of claim 1, wherein a given peripheral may include one or more of a robot arm, a camera, a gripper, a seven degree of freedom (DOF) arm with a camera, a device for assessing device-under-test functionality, a sensor for measuring a location of a device-under-test, and an input/output (I/O) peripheral for interfacing to an external device.

7. The modular reconfigurable workcell of claim 1, wherein the one or more modular docking bays are arranged in an M×N array, and wherein the power circuitry and the processor are arranged between rows of the modular docking bays.

8. The modular reconfigurable workcell of claim 1, wherein the one or more modular docking bays are arranged in a 1×M array, and wherein the power circuitry and the processor are arranged underneath a row of the modular docking bays.

9. The modular reconfigurable workcell of claim 1, further comprising a cover secured over a given modular docking bay that is without a corresponding docking module.

10. The modular reconfigurable workcell of claim 1, wherein the one or more modular docking bays are identical.

11. The modular reconfigurable workcell of claim 1, wherein the processor further receives from a respective attached peripheral a description of the respective attached peripheral including geometric features of the attached peripheral upon attachment of a corresponding docking module of the respective attached peripheral to the one or more modular docking bays.

12. The modular reconfigurable workcell of claim 1, wherein the processor further determines the geometric calibration based on the location of the one or more docking modules with respect to each other.

13. The modular reconfigurable workcell of claim 1, further comprising a power supply and a central backplane circuitry board that provides electrical interconnects between the one or more docking modules and the power supply and between the one or more docking modules and the processor.

14. The modular reconfigurable workcell of claim 1, further comprising an enclosure including:
the one or more modular docking bays accessible through the surface of the workcell;
the electrical subsystem; and
the processor,
wherein the enclosure is sealed to an outside environment.

15. The modular reconfigurable workcell of claim 1, further comprising:
an inertial measurement unit (IMU) to determine one or more of an acceleration experienced by the workcell and an orientation of the workcell,
wherein the processor is coupled to the IMU to receive the one or more of the acceleration and the orientation of the workcell and to determine an indication of a malfunctioning peripheral or contact of a peripheral with another element.

16. A modular reconfigurable workcell comprising:
one or more modular docking bays on a surface of the workcell that support attachment of docking modules in a fixed geometric configuration, wherein respective modular docking bays include a plurality of electrical connections for a variety of power and communication busses of the docking modules to be attached;
one or more docking modules inserted within the one or more modular docking bays, wherein the one or more docking modules provide an electrical and mechanical interface between a respective peripheral and the workcell; and
a processor for determining a geometric calibration of attached peripherals based on a location and an orientation of corresponding one or more docking modules attached to the one or more modular docking bays and based on an identification of the attached peripherals of the corresponding one or more docking modules, wherein the identification indicates geometry information of the attached peripherals on the one or more docking modules useful for determining distances between the attached peripherals, wherein the geometric calibration indicates the distances between the attached peripherals and poses of the attached peripherals that enable the attached peripherals to interact with each other.

17. The modular reconfigurable workcell of claim 16, wherein the one or more docking modules includes one or more lever arms to engage with one or more structural features in the one or more modular docking bays and to create a rigid connection between the one or more docking modules and the workcell.

18. The modular reconfigurable workcell of claim 16, wherein the one or more modular docking bays are arranged in an M×N array, and wherein the power circuitry and the processor are arranged between rows of the modular docking bays.

19. A modular reconfigurable workcell comprising:
an enclosure including:
one or more modular docking bays on a surface of the enclosure that support attachment of docking modules in a fixed geometric configuration and form a volume in the enclosure for insertion of the docking modules, wherein respective modular docking bays include a plurality of electrical connections for a variety of power and communication busses of the docking modules to be attached;

an electrical subsystem for coupling the communication busses between the one or more modular docking bays and providing power circuitry to the one or more modular docking bays; and one or more docking modules inserted within the one or more modular docking bays in the enclosure, wherein the one or more docking modules provide an electrical and mechanical interface between a respective peripheral and the workcell.

20. The modular reconfigurable workcell of claim 19, further comprising:

a processor for determining a geometric calibration of attached peripherals based on a location and an orientation of corresponding one or more docking modules attached to the one or more modular docking bays and based on an identification of the attached peripherals of the corresponding one or more docking modules; and wherein the processor further determines the geometric calibration based on the location of the one or more docking modules with respect to each other.

* * * * *